Figure 1:
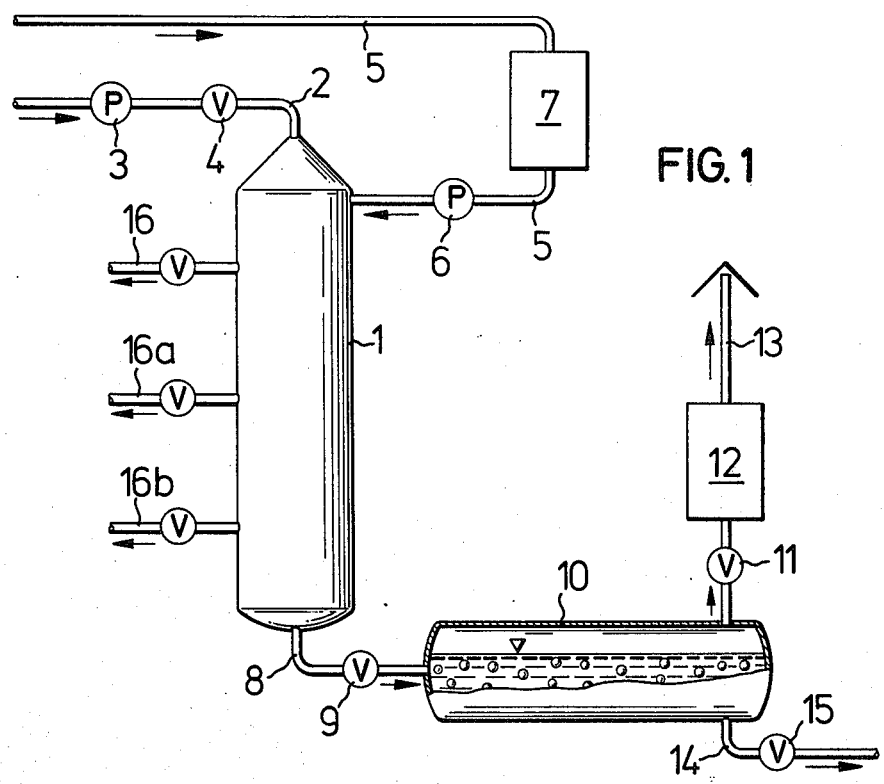

United States Patent [19]
Herbrechtsmeier et al.

[11] 4,353,717
[45] Oct. 12, 1982

[54] PROCESS FOR ABSORBING OZONE

[75] Inventors: Peter Herbrechtsmeier, Hofheim am Taunus; Günter Greiner; Wolfgang Grünbein, both of Liederbach; Norbert Nix, Hofheim am Taunus; Hans Schäfer, Bad Soden am Taunus; Wolfgang Wendel, Kelkheim, all of Fed. Rep. of Germany

[73] Assignee: Hoechst Aktiengesellschaft, Frankfurt am Main, Fed. Rep. of Germany

[21] Appl. No.: 247,009

[22] Filed: Mar. 24, 1981

[30] Foreign Application Priority Data

Mar. 26, 1980 [DE] Fed. Rep. of Germany ....... 3011615

[51] Int. Cl.³ .............................................. B01D 47/00
[52] U.S. Cl. .......................................... 55/68; 55/93; 210/760; 423/210
[58] Field of Search ...................... 55/68, 93; 210/760; 423/210 R

[56] References Cited
U.S. PATENT DOCUMENTS

| 996,561 | 6/1911 | Bradley . | |
| 1,047,534 | 12/1912 | Joseph | 210/760 |
| 2,606,150 | 8/1952 | Thorp | 210/760 |
| 3,448,045 | 6/1969 | Hess et al. | 210/760 |
| 4,252,654 | 2/1981 | Leitzke et al. | 210/760 |

FOREIGN PATENT DOCUMENTS 2734453  2/1979  Fed. Rep. of Germany .

Primary Examiner—Bernard Nozick
Attorney, Agent, or Firm—Curtis, Morris & Safford

[57] ABSTRACT

The invention relates to a process for absorbing ozone in water by introducing an ozone-containing gas into a water current streaming downward in an absorber, wherein the ozone-containing gas is introduced into the water current in the form of bubbles at the upper end of the absorber and subsequently conveyed downward to the absorber outlet in a direction opposed to its ascending direction.

2 Claims, 2 Drawing Figures

PROCESS FOR ABSORBING OZONE

Ozone is being used frequently in the waste water treatment in order to decompose organic contaminants, the ozone being introduced into the process in gas/liquid contact apparatuses of the most different type such as bubble columns, mechanically stirred basins, jet nozzles and packed columns. When using bubble columns, the ozone-containing gas is introduced into the liquid by means of static gassing means and is additionally fed to the bubble column at the bottom of the latter via an inlet tube, after having been incorporated in rapidly flowing liquids, the residence time of the gas bubbles in the gas inlet tube, as compared to their ascending time in the bubble column, being short.

To achieve a satisfactory ozone absorption degree, the known absorbers must have a considerable height or a considerable volume. They moreover have a tendency to form gas cushions at their top.

It is therefore the object of the present invention to overcome the disadvantages of the state of the art and to provide a corresponding process, that, owing to its very specific operation mode, enables an absorber of compact overall dimensions, that is, a short height and a small volume, to be used. A further object of the present invention is to provide an absorber, in which said formation of a gas cushion does not occur or occurs to a small extent only.

The present invention provides therefore a process for absorbing ozone in water by introducing an ozone-containing gas into a water current streaming downward in an absorber, which comprises introducing the ozone-containing gas into the stream of water in the form of bubbles at the upper end of the absorber and passing it downward to the absorber outlet, in a direction opposed to its ascending direction.

The present invention further provides an apparatus for carrying out said process, consisting substantially of a cylindrical absorber part closed at least at the top, inlet means at the upper part of the absorber for the ozone-containing gas and for the water and at least one outlet at the bottom part of the absorber for the ozone-containing water as well as for the gas portions that have not been absorbed, a phase separator being optionally located at a level between the lower part of the absorber and the outlet, wherein the top of the absorber is pointed (tapered).

The process of the invention, consequently, involves conveying the ozone-containing gas and the water in parallel flow in the absorber from the top to the bottom thereof.

Gassing, that means the introduction of the ozone-containing gas into the liquid preferably streaming downward in vertical direction, takes place at the upper part of the absorber close to the top of the absorber in order to utilize the total absorber length to an utmost degree. Gassing preferably takes place at a level located 0 to 20%, relative to the total height of the absorber, below the absorber head using suitable means. Examples hereof are perforated plates arranged preferably radially with respect to the circumference of the absorber, sintered plates, binary nozzles etc. The hole diameter of these gassing means which influences the average bubble diameter of the gas conveyed downward is generally below 2 mm, preferably from 0.1 to 1 mm. The average bubble diameter depends furthermore on the speed of the liquid flow (so-called superficial velocity), as well as on surface tension and viscosity of the liquid. In order to allow the length of the absorbers to be kept as short as possible, the average bubble diameter generally should not exceed 10 mm, preferably it is from 0.2 to 6 mm. It has to be taken into consideration that large bubbles have a higher ascending speed than small ones, thus reducing control of the system in the case of a broad bubble size distribution range.

The superficial velocity determines the residence time of the gas in the absorber and is advantageously adjusted to a value below 2 m/sec., in order to ensure an absorber distance as short as possible. Preferably, however, it is below about 0.6 m/sec. and more preferably it is between 0.5 and 0.2 m/sec. The theoretical lower limit as set by the point where the downstream speed of the liquid and the ascending speed of the bubbles are identical, so that the gas bubbles are in a stae of suspension. This value, depending on the gas size distribution, the composition of the gas, the temperature of the liquid and the gas/liquid density ratio, is about 0.18 m/sec. in the case of pure water and oxygen.

The average residence time of the ozone-containing gas in the absorber is generally from about 60 seconds to 0.2 second, preferably from 0.5 second to 20 seconds, per meter of absorber length.

A significant prolongation of the residence time hereinbefore mentioned does not bring about any advantage, but rather defavorably influences the gas throughput.

The volume ratio of liquid to ozone-containing gas is generally greater than about 4:1, preferably greater than 6:1. Particularly favorable results are obtained with volume ratios in the range of from 7:1 to 15:1. Generally, the absorption degree increases with increasing volume ratio of liquid to gas. In principle, a ratio of below 4:1 is allowed, but it increases the risk of formation of large bubbles and thus formation of a gas cushion at the top of the absorber, which cushion may cause forced emptying of the absorber.

The process of the invention may be carried out under normal pressure. For increasing the absorption degree, however, it is advantageous to operate under an elevated pressure of, for example, up to 15 bar, preferably from 4 to 7 bar.

The ozone-containing gas is produced according to known methods in apparatuses suitable for this purpose using air or mixtures of nitrogen and oxygen of any concentration or pure oxygen, the use of pure oxygen having inter alia the advantage that a more favorable gas/liquid ratio in the absorber can be reached owing to a higher ozone concentration.

For carrying out the process of the invention there may be used generally any of the known apparatuses. A suitable apparatus may consist substantially of a cylindrical absorber part closed at least at the top, inlet means at the upper part of the absorber for the ozone-containing gas and for the water and of at least one outlet at the bottom part of the absorber for the ozone-containing water as well as for the gas portions that have not been absorbed, a phase separator being optionally mounted at a level between the lower part of the absorber and the outlet.

Reference may be made in this connection to the bubble column-downstream reactor disclosed in German Offenlegungsschrift No. 2,734,453, that substantially consists of an absorption tube closed at the top, wherein the gas/liquid mixture streams downward, said tube being immersed into a recipient serving as gas/liquid separator. The liquid freed from gas portions that have not been absorbed may be recycled to the top of the absorber by means of a pump. The same is true of the gas optionally reloaded with ozone and which has not been absorbed.

Suitable materials for the apparatus of the invention are ozone-resistant materials, preferably glass or stainless steel.

The height and the inner width of the cylindrical absorber part are not critical and may generally vary within wide limits. An absorber wherein the ratio of height to inner width is greater than 1, preferably greater than 3, will be preferred generally. It has been found moreover that a column height of 2 meters in the case of an inner width of 0.30 m is sufficient for attaining a high absorption degree and that even a column height of only 0.3 to 0.5 meter leads to nearly the same good results.

A cylindrical absorber, having an upper portion which is conically shaped immediately above the point at which the gas is introduced is used preferably according to the invention. The formation of a gas cushion is prevented in surprisingly simple manner owing to this very special design of the absorber. The crossing angle between the walls forming the top of the absorber (cone) is not critical and is generally from 4° to 20°, preferably from 6° to 10°.

Figure 2:
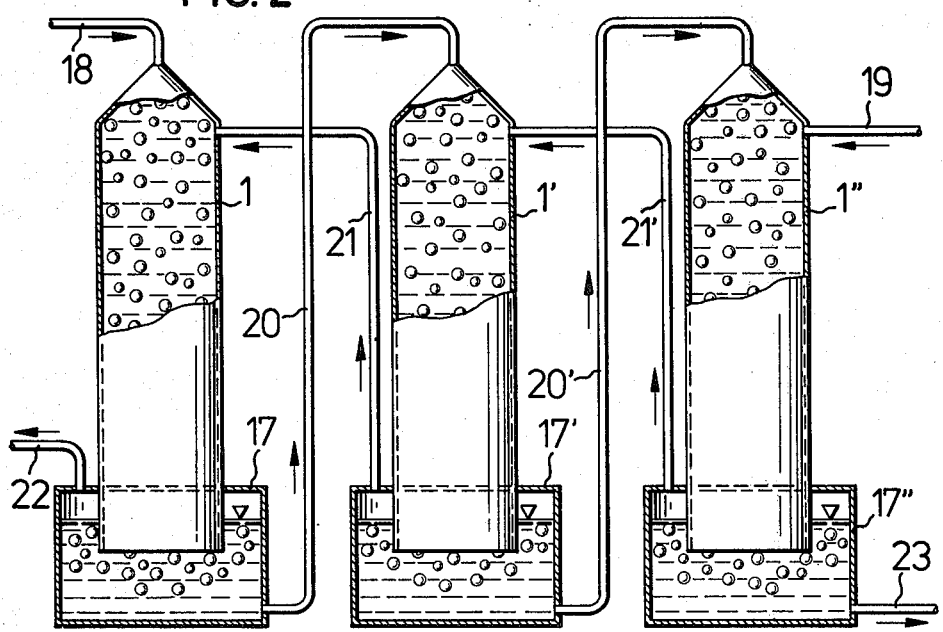

The ozone absorption degree may be improved when series-connecting several downstream reactor units (cf. FIG. 2). It may moreover be advantageous to recycle the gas leaving the absorber in known manner to the ozone generator and to reuse it in the absorption process after having reloaded it with ozone.

The water rich in ozone obtainable according to the process of the invention may be used in many fields, for example drinking water conditioning or waste water purification. Especially advantageous is the operation mode as described in German Offenlegungsschrift No. 2,556,328, where a partial current only of the water to be treated is loaded with ozone under elevated pressure, which current is then remixed with the main water current under normal pressure. The packed column described for this application in the above Offenlegungsschrift would have to be replaced by the downstream absorber according to the invention, and the ozone-containing gas would have to be fed in at the top of the absorber.

Alternatively, the total quantity of the water to be treated may be conveyed to the downstream absorber. The absorption degree may be improved, if the total length of the absorber is such that the residence time of the liquid phase is sufficiently long to allow a subsequent chemical reaction to proceed. This makes it possible to combine the ozone absorption and a subsequent reaction of the absorbed ozone with the water ingredients, which hitherto took place in a dwelling recipient subsequent to the absorber, in the downstream absorber.

The invention will be illustrated, by way of example, in the accompanying drawings, which represent the process and the apparatus of the invention.

FIG. 1 represents a flow scheme of a possible test arrangement. The numeral (1) designates the column-shaped absorber, the top of which is tapered. (2) designates the water inlet, (3) a pump and (4) a valve. The ozone-containing gas is fed in via pipe (5) by passing from the ozone generator (7) over a pump (6). The absorber is provided with an outlet (8) for the ozone-containing water and for the gas that has not been absorbed, said outlet extending to the valve (9) and subsequently to the dwelling recipient (10), where a separation of liquid and gaseous phase takes place. The dwelling recipient is equipped with a pipe leading via valve (11), the ozone destructor (12) and the outlet (13) to the open air. When the reaction is complete, the liquid leaves the dwelling recipient via pipe (14) and valve (15). Numerals (16), (16a) and (16b) designate outlet pipes for taking samples.

FIG. 2 illustrates an apparatus for a multi-stage absorption of ozone. This apparatus consists of several absorbers (1), (1'), and (1") the top of each of which is tapered. Numerals (17), (17') and (17") desgniate recipients that serve as gas/liquid separators. Fresh water is fed in via pipe (18) and the ozone-containing gas is fed in via pipe (19). Numerals (20) and (20') and (21) and (21'), respectively, designate the corresponding connection pipes between the individual absorbers for the ozone-containing water and the gas that has not been absorbed, respectively, said gas escaping via pipe (22). The water loaded with ozone is withdrawn through outlet (23). Further absorbers may be cascade-connected at the positions (22) and/or (23).

The following example illustrates the invention:

EXAMPLE

The absorber used consisted of a stainless steel column having an inner diameter of 0.3 m and a length of 3 m. Its tapered top formed an angle of 10°. The distance between the positions where gassing took place and where samples were taken was 2 meters. The ozone to be absorbed was produced from pure oxygen in a usual ozone generator and the resulting ozone/oxygen mixture was fed in at the top of the absorber by means of a water-ring compressor. Four radially arranged perforated plates served as gassing means, the number of holes per plate being 128, the diameter of the holes being 0.5 mm and the distance of the perforated plates from the top of the columm being 0.8 m. Water was fed in at the top of the column by means of a pump, while adjusting the pressure of the feed water to the pressure of the ozone-containing gas in adequate manner. The water temperature was about 15° C. An average bubble diameter of about 4 mm had soon established itself with a superficial velocity of 0.3 m/sec.

Further details concerning the operation mode and the absorption degree obtained can be seen from the following table:

| Test | Pressure (absolute) | Initial concentration* | Gas throughput (operation state) | Water-throughput | Absorption degree |
|---|---|---|---|---|---|
| 1 | 1.4 bar | 73 g/m³ | 10.7 m³/h | 65 m³/h | 80% |
| 2 | 3.0 bar | 73 g/m³ | 5.5 m³/h | 51 m³/h | 85% |
| 3 | 6.0 bar | 48 g/m³ | 7.3 m³/h | 86 m³/h | 86% |
| 4 | 6.0 bar | 46 g/m³ | 4.7 m³/h | 70 m³/h | 89% |
| 5 | 6.0 bar | 49 g/m³ | 3.3 m³/h | 70 m³/h | 96% |

*at a gas volume in normal state

It was found that the absorption degree reached when using a column of only 0.5 meter length under identical conditions was nearly as good as that reached when using the longer column hereinbefore described.

The absorption degree $\phi$ was determined according to the following equation:

$$\phi\, O_3 = \frac{n_E - n_A}{n_E}$$

in which $n_E$ = molar number of $O_3$ in the gas fed in before the column, and $n_A$ = molar number of $O_3$ in the gas let off after the column.

The formation of a gas cushion at the top of the column could not be observed even after an 8 hours' operation time.

What is claimed is:

1. A process for absorbing ozone in water by introducing an ozone-containing gas into a water current streaming downwardly in a cylindrical absorber, which comprises introducing the ozone-containing gas into the stream of water in the form of bubbles at the upper end of the absorber and passing the gas bubbles downwardly to an absorber outlet, said ozone-containing gas being introduced into the water stream at a rate independent of the velocity of the water stream flowing downwardly through the absorber, the velocity of the water stream being greater than about 0.6 m/sec. above the point at which the ozone-containing gas is introduced and less than about 0.6 m/sec. below said gas introduction point, said absorber having a conical shape immediately above said gas introduction point and absorbing ozone in the water.

2. The process of claim 1, wherein the absorption is carried out under an elevated pressure amounting up to 7 bar.

* * * * *